UNITED STATES PATENT OFFICE.

THOMAS SIM AND ELIAS S. HUTCHINSON, OF BALTIMORE, MD.

IMPROVED MODE OF PREPARING GRAIN FOR DISTILLATION.

Specification forming part of Letters Patent No. 87,980, dated March 16, 1869.

*To all whom it may concern:*

Be it known that we, THOMAS SIM and ELIAS S. HUTCHINSON, both of Baltimore, Maryland, have invented a new and Improved Mode of Preparing Grain and other Materials for Distillation; and we declare that the following is a full, clear, and exact description thereof.

Our invention consists in removing oils from the grain or other material previous to mashing. The removal of these oils exposes the starch-globules, so that they may all be broken, and the whole of the starch liberated and subjected to fermentation.

In carrying out our invention, we prefer to proceed as follows: The meal is placed in a suitable vat, and subjected to the action of the liquid bisulphide of carbon or other suitable chemical, which, rising in the mass of meal, carries the oil with it, and the oil and bisulphide are allowed to flow over together through a suitable pipe or pipes until the absence of oil in the bisulphide indicates that the oil is all removed from the meal. As much of the bisulphide as will flow away may then be drawn off at the bottom of the vat, and the remainder may be completely evaporated by exhaustion or heat, or both, or simply by atmospheric exposure. In either case the meal is left in a dry powder, entirely free from the chemical, and ready for mashing.

By this process we are enabled to utilize the whole of the starch contained in the grain or other matter instead of from one-half to two-thirds thereof, as under the present system of distilling; and as we are enabled to produce spirit perfectly free from impurities and essential oils, the expense of rectification is avoided, and a better result obtained than is possible even with rectification under the customary plan.

We thus produce pure alcohol by a single direct distillation, and the spirit, being free from any peculiar flavor, can be subsequently flavored in any way desired.

The value of the oil produced by this process is much more than sufficient to pay the entire cost of the operation.

The bisulphide vapor may, of course, be recondensed for future use.

We claim as new and of our invention—

1. The removal from grain or other material of oils by a chemical agent, as a preliminary to fermentation and distilling.

2. As an improved process of producing distilled spirits, removing, by a chemical agent, the oil from the unfermented grain or other material, and subsequently mashing, fermenting, and distilling the same, substantially as described.

To the above specification of our invention we have signed our hands this 26th day of February, 1869.

THOS. SIM.
ELIAS S. HUTCHINSON.

Witnesses:
OCTAVIUS KNIGHT,
W. B. DEMING.